(12) United States Patent
Moore

(10) Patent No.: US 7,364,062 B2
(45) Date of Patent: Apr. 29, 2008

(54) MAGNETIC PULSE WELDING OF STEEL PROPSHAFTS

(75) Inventor: James B. Moore, Grosse Ile, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 267 days.

(21) Appl. No.: 10/968,765

(22) Filed: Oct. 19, 2004

(65) Prior Publication Data

US 2006/0081684 A1 Apr. 20, 2006

(51) Int. Cl.
B23K 20/06 (2006.01)
B23K 13/01 (2006.01)

(52) U.S. Cl. ...................... 228/115; 219/617

(58) Field of Classification Search ............... 228/115; 219/602, 603, 607, 617

See application file for complete search history.

(56) References Cited

U.S. PATENT DOCUMENTS

| | | | |
|---|---|---|---|
| 3,520,049 A | 7/1970 | Lysenko et al. | |
| 3,528,596 A | 9/1970 | Carlson | |
| 3,699,297 A * | 10/1972 | Grin et al. | 219/604 |
| RE29,016 E * | 10/1976 | Peacock | 219/611 |
| 4,129,846 A | 12/1978 | Yablochnikov | |
| 4,150,274 A | 4/1979 | Minin et al. | |
| 4,469,356 A | 9/1984 | Duret et al. | |
| 4,807,351 A | 2/1989 | Berg et al. | |
| 4,930,204 A * | 6/1990 | Schurter | 29/419.2 |
| 5,803,128 A | 9/1998 | Reed | |
| 5,813,264 A * | 9/1998 | Steingroever | 72/56 |
| 5,824,998 A | 10/1998 | Livshiz et al. | |
| 5,966,813 A | 10/1999 | Durand | |
| 5,981,921 A * | 11/1999 | Yablochnikov | 219/603 |
| 6,086,162 A | 7/2000 | Pinch et al. | |
| 6,860,013 B1 * | 3/2005 | Durand | 29/897.2 |

FOREIGN PATENT DOCUMENTS

GB 1 581 623 12/1980
WO WO 2004/073913 9/2004

* cited by examiner

*Primary Examiner*—Kevin P. Kerns
(74) *Attorney, Agent, or Firm*—Harness, Dickey & Pierce, P.L.C.

(57) ABSTRACT

A method of magnetically welding an end fitting to a metal tube includes assembling a driver ring over an end of the tube and inserting a length of the end fitting into a bore of the tube. An overlap region of the tube, the driver ring and the cylinder are encompassed by an inductor assembly of a magnetic pulse welding apparatus and the tube is welded to the end fitting using the magnetic welding apparatus.

8 Claims, 4 Drawing Sheets

MAGNETIC PULSE WELDING OF STEEL PROPSHAFTS

FIELD OF THE INVENTION

The present invention relates to welding, and more particularly to magnetic pulse welding of steel components of a propeller shaft of a vehicle.

BACKGROUND OF THE INVENTION

Vehicular driveshafts including, but not limited to, propeller shafts, transfer drive torque from one drivetrain component to another. For example, a driveshaft is commonly used to transfer drive torque from the output shafts of a transfer case to the differentials in the axle assemblies for driving the wheels of the motor vehicle. Driveshafts typically include a tube having angularly articulable joints disposed at either end. Exemplary joints include, but are not limited to, universal joints (UJ) and constant velocity joints (CVJ). The angularly articulable joints enable the driveshaft to accommodate changing relative angles between the drivetrain components while transferring drive torque therebetween.

Traditionally, joints have been attached to the tube using common welding techniques, which result in imbalance in the driveshaft. As a result of this imbalance, the driveshafts must be balanced in order to inhibit noise and vibration that would otherwise be generated by the spinning driveshaft. The requisite balancing process increases the manufacturing cost and the weight of the driveshaft.

Alternative welding techniques, such as magnetic pulse welding (MPW), have been implemented to improve driveshaft balance during manufacture, thereby reducing the need for post-manufacture balancing. An exemplary MPW method is disclosed in U.S. Pat. No. 5,981,921, issued on Nov. 9, 1999 and entitled Method of Magnetic Pulse Welding an End Fitting to a Driveshaft Tube of a Vehicular Driveshaft. Although the welding method disclosed in U.S. Pat. No. 5,981,921 is acceptable for welding an aluminum tube to a steel joint, this method is unable to provide acceptable welds when welding components fabricated from a broader range of material types.

SUMMARY OF THE INVENTION

Accordingly, the present invention provides a method of magnetically welding an end fitting to a metal tube. The method includes assembling a driver ring over an end of the tube and inserting a length of the end fitting into a bore of the tube. An overlap region of the tube, the driver ring and the cylinder are encompassed by an inductor assembly of a magnetic pulse welding apparatus and the tube is welded to the end fitting using the magnetic welding apparatus.

In one feature, the method further includes concentrically aligning the end fitting and the tube to maintain a tolerance between the end fitting and the tube within a desired range.

In another feature, the driver ring is press-fit over the end of the tube.

In still another feature, the method further includes venting gases generated during welding through an open end of the tube.

In yet another feature, the driver ring has a higher electrical conductivity than the tube.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
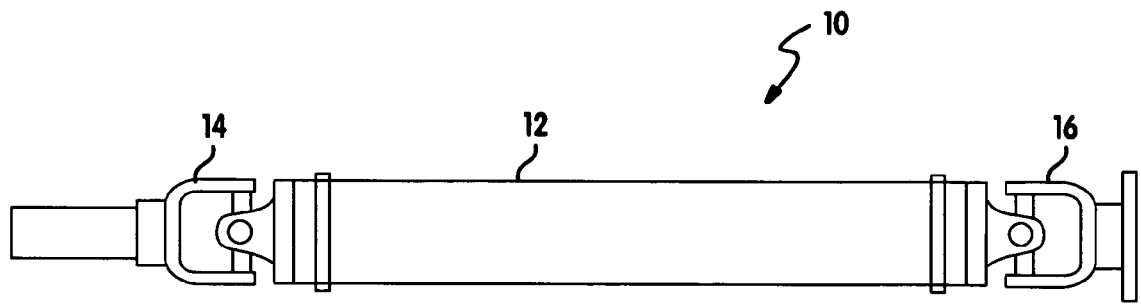
FIG. 1 is an illustration of an exemplary propeller shaft.

Referring now to FIG. 1, an exemplary propeller shaft 10 is illustrated. The propeller shaft 10 is of a type that is used to transfer drive torque from a transmission to a differential in a vehicle drivetrain. The propeller shaft 10 includes a tube 12, a slip joint assembly 14 and a flange or bolt joint assembly 16. It is appreciated that the propeller shaft 10 can include two slip joint assemblies 14 positioned at either end or two flange joint assemblies 16 at either end. It should also be noted that although the joint assemblies 14, 16 are illustrated as universal joints, they are merely exemplary in nature. It will be understood that other joint types, such as a constant velocity joint (CVJ), can substitute.

Figure 2:
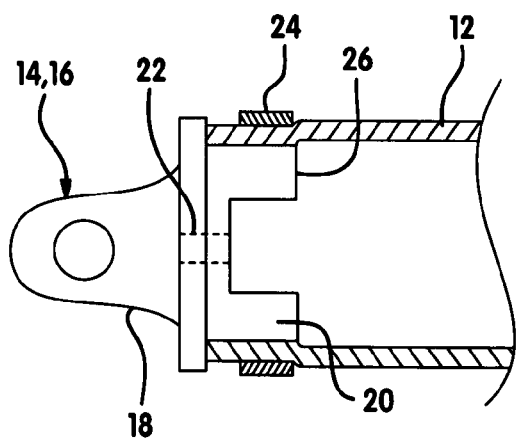
FIG. 2 is a cross-sectional view of an end of the propeller shaft of FIG. 1 illustrating welded components of the propeller shaft.

Referring now to FIG. 2, the tube 12 is welded to the joint assemblies 14,16 using the magnetic pulse welding process of the present invention. Each joint assembly 14,16 includes a weld yoke 18 having a cylindrical land 20 extending therefrom. A bore or vent passage 22 extends through the land 20 to enable gases to escape during the welding process, as described in further detail below. The magnetic pulse welding process of the present invention collapses a driver ring 24 and the tube 12 on to the land 20 of the joint assembly 14,16. The tube 12 and the land 20 are pressed together under such significant pressure that they are bonded or welded together. Because the collapsing force is so great, the land wall 26 must have a sufficient thickness to inhibit it from collapsing. The thickness of the land wall 26 is determined empirically on a case by case basis based on material properties and dimensions.

Figure 3:
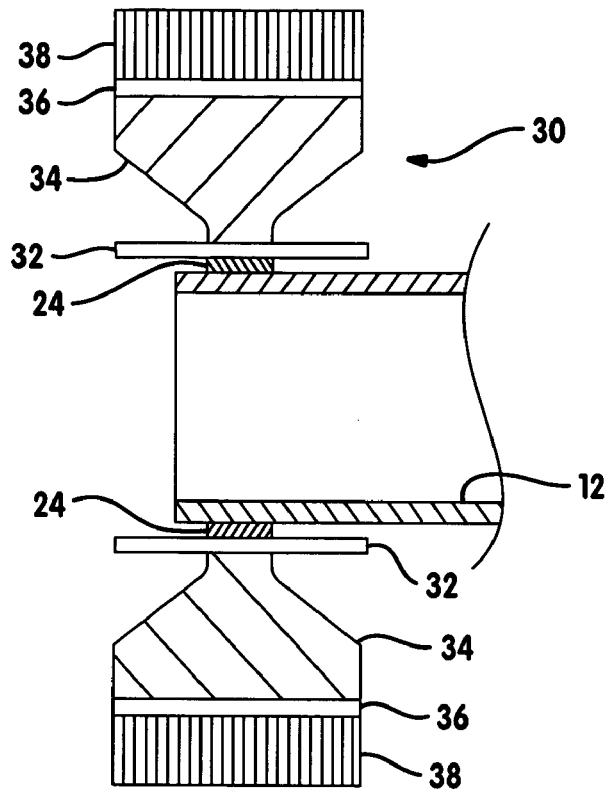
FIG. 3 illustrates a fitting cycle for press-fitting a driver ring to an end of a propeller shaft tube of the propeller shaft.
Figure 4:
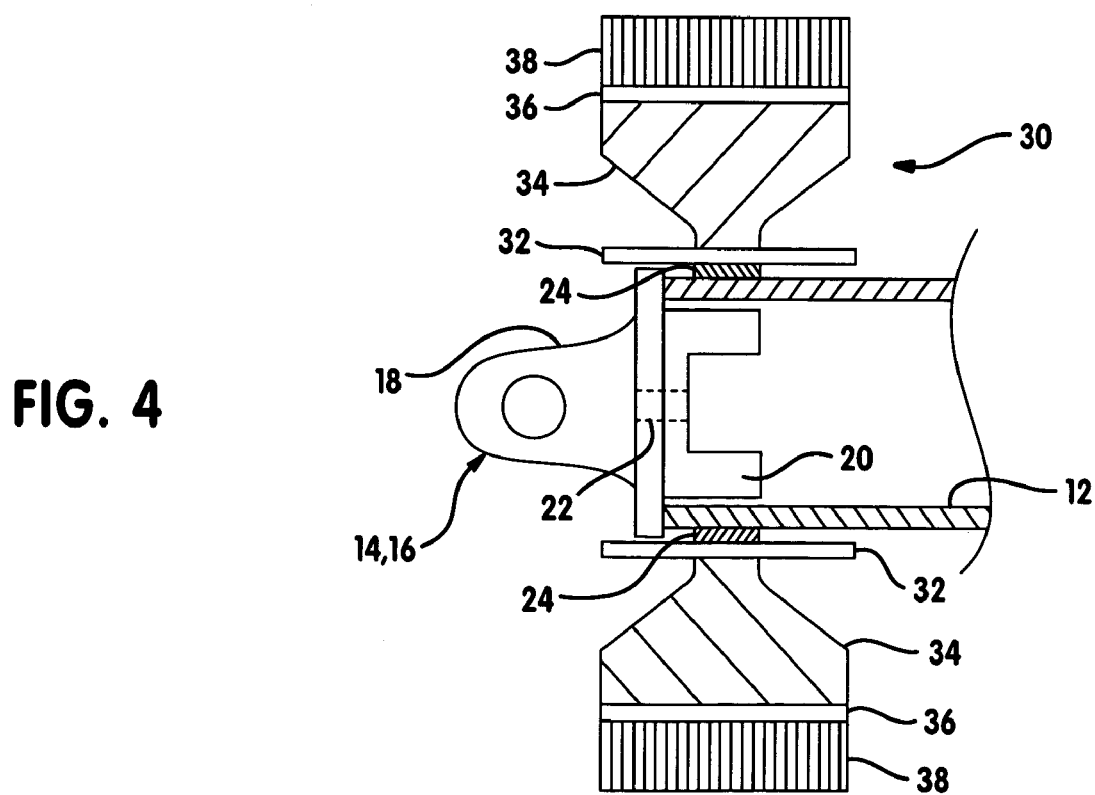
FIG. 4 illustrates a welding cycle for welding a yoke to the propeller shaft tube using a centering device.

Referring now to FIGS. 3 through 4, the magnetic welding process of the present invention will be described in detail. In order to enable a sufficiently strong bond between the components (i.e., tube 12 and weld yoke 18 ) the tolerance between the inner diameter (ID) of the tube 12 and the outer diameter (OD) of the land 20 is maintained within a desired range. The tolerance range is based on the material properties of both the land 20 and the tube 12 and is further determined based on the particular dimensions of the components. More specifically, the tolerance range is empirically determined for each component set (i.e., tube and weld yoke). Table 1 below, provides exemplary dimensions and a corresponding tolerance range for an exemplary application.

TABLE 1

| Dimension | Value (in) |
|---|---|
| Land OD | 2.35 |
| Tube ID | 2.609/2.639 |
| Tolerance Range | 0.005/0.015 |

During the magnetic welding process, the tube 12 and weld yoke 18 are concentrically aligned along a common axis. Alignment of the components is tightly maintained to ensure that the tolerance between the land OD and the tube ID is maintained within the tolerance range at every point about the external circumference of the land 20 and the internal circumference of the tube 12. By maintaining the tolerance range, the tube 12 is inhibited from moving (e.g., bouncing) relative to the weld yoke 18 during the assembly process.

The magnetic welding process of the present invention further implements the annular band or driver ring 24 that is disposed about the OD of the tube 12. The driver ring 24 is made from a highly conductive material including, but not limited to, annealed copper (Cu), a Cu alloy, aluminum (Al), an Al alloy and silver (Ag). The driver ring 24 has a significantly higher conductivity than the tube 12. For example, in the case of a Cu driver ring 24 and a steel tube 12, the driver ring 24 includes an exemplary conductivity of $6.0 \times 10^7$ $(\Omega\text{-m})^{-1}$ and the tube 12 includes an exemplary conductivity of $0.6 \times 10^7$ $(\Omega\text{-m})^{-1}$. In this case, the driver ring 24 is approximately 10 times more conductive than the tube 12. The driver ring 24 is preferably press-fit over the tube OD prior to assembling the weld yoke 18 onto the tube 12. It is further anticipated that the driver ring 24 can be assembled onto the tube OD in other manners known in the art including, but not limited to, welding.

The tube 12 and weld yoke 18 are welded together using an inductor assembly 30. The inductor assembly 30 includes a first insulator ring 32, a shaper ring 34, a second insulator ring 36 and an inductor coil 38. The first and second insulator rings 32,36 are formed from a dielectric material (e.g., Teflon®) and respectively provide electrical insulation between the tube 12 and the shaper 34 and between the shaper 34 and the inductor coil 38. The shaper 34 focuses the electromagnetic energy generated by the inductor coil 38 over the driver ring 24. The shaper 34 is preferably formed of a metal material including, but not limited to, copper alloy and is geometrically constructed to focus the magnetic field generated by the inductor coil 38 over the driver ring 24, as discussed in further detail below.

Stored energy from an energy storage device (e.g., a capacitor bank) is transmitted into the inductor coil 38, which transforms the electrical energy into magnetic energy to generate a magnetic field. The magnetic field generates eddy currents through the components. Because the shaper 34 focuses the electromagnetic energy, the eddy currents are particularly generated in the driver ring 24. The eddy currents oppose the magnetic field generated by the inductor coil 38, which produces a repulsive force that induces the driver ring 24 to collapse over the tube 12 and the land 20. The collapsing force is so great and the driver ring 24, the tube 12 and the land 20 are driven together at such a high rate of speed that the components are welded together.

It should further be noted that the external circumference of the land can be straight and not include any features formed therein. More specifically, traditional magnetic pulse welding methods require features such as recesses to be formed in the land to provide sufficient retention of the joint to the tube after the welding process. Forming such features increases the manufacturing cost and complexity of the joint. Although the method of the present invention relieves the need for such features to be formed in the land, it will be appreciated that the present method can be implemented with lands that include such features.

Figure 5:
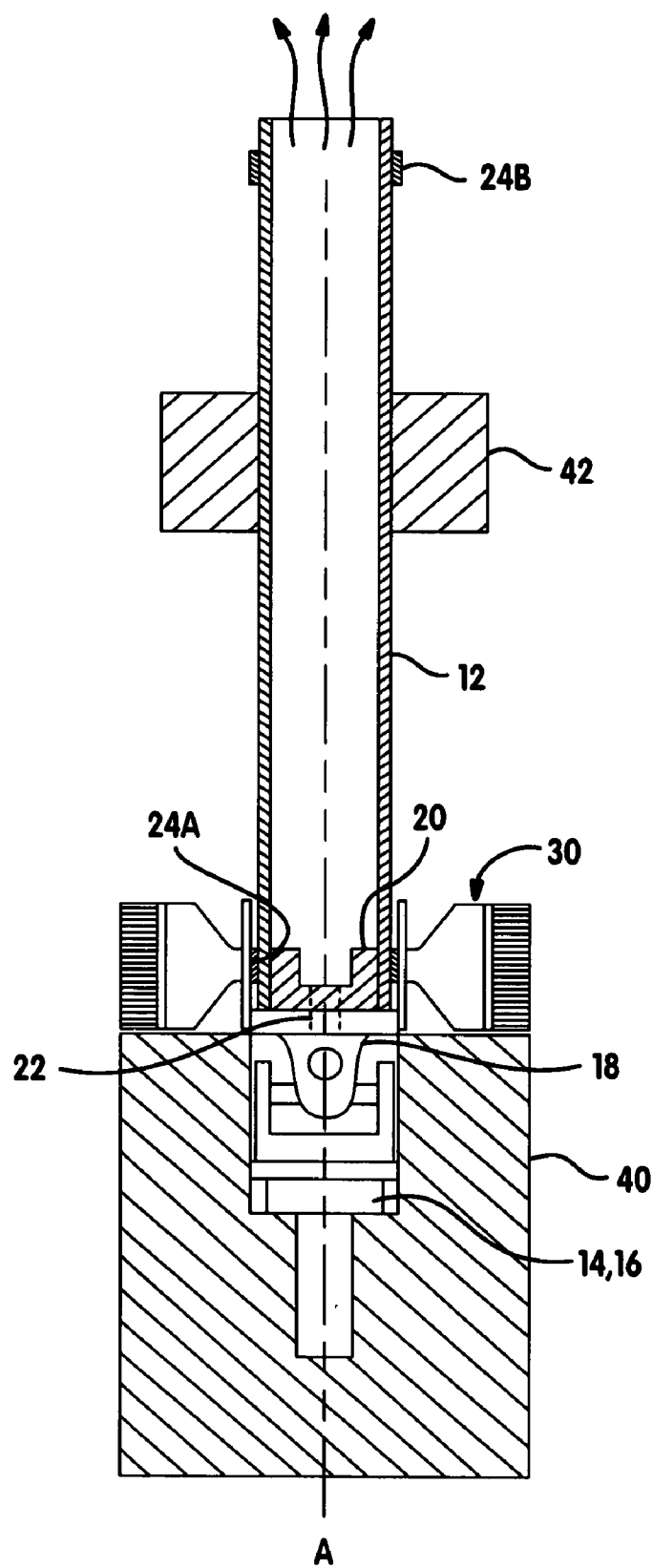
FIG. 5 illustrates a partial cross-sectional view of an assembly step of the exemplary propeller shaft.
Figure 6:
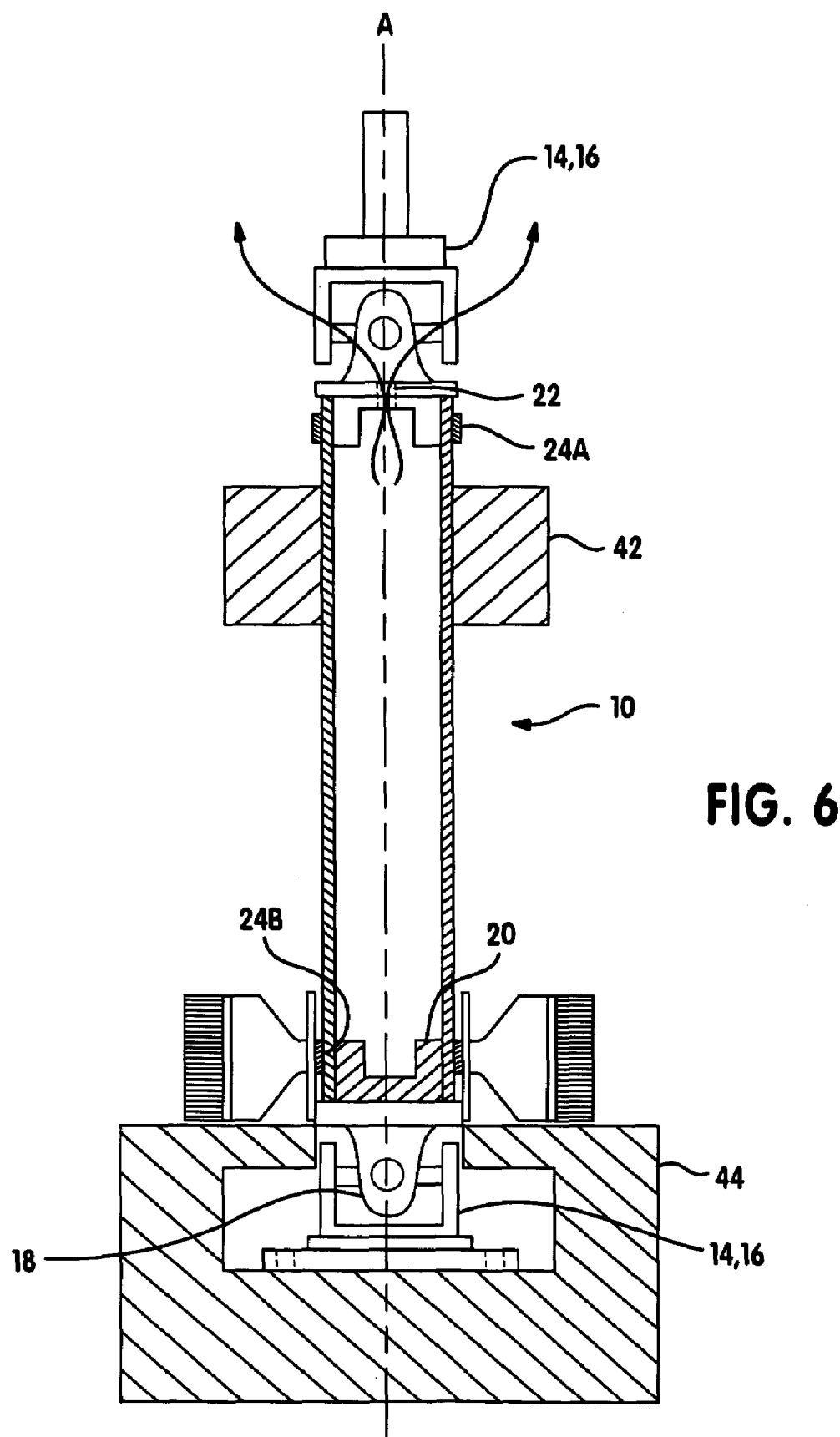
FIG. 6 illustrates a partial cross-sectional view of an assembly step of the exemplary propeller shaft.

Referring now to FIGS. 5 and 6, the assembly process of the exemplary propeller shaft 10 will be described in detail. A first driver ring 24A is assembled onto a first end of the tube 12 and a second driver ring 24B is assembled onto a second end of the tube 12. The first joint assembly 14,16 is mounted in a fixture 40 that locates the first joint assembly to align a center axis of the first joint assembly 14,16 on a central axis A. The fixture 40 can include locating features (not shown) including, but not limited to, recesses and/or tabs that mate with corresponding recesses and/or tabs of the first joint assembly 14,16. The tube 12 is concentrically located on the central axis A by a fixture 42 and is assembled onto the weld yoke 18 of the first joint assembly 14,16. More specifically, the land 20 is received into the tube 12. The inductor assembly 30 encompasses the first joint assembly 14,16, the driver ring 24 and the tube 12 and is energized to induce welding of the tube 12 and the first joint assembly 14,16 as described in detail above. Gas pressure generated within the interior of the tube 12 during the magnetic pulse welding process can escape through the open second end of the tube 12.

The second joint assembly 14,16 is mounted in a fixture 42 that locates the second joint assembly 14,16 to align a center axis of the second joint assembly 14,16 on the central axis A. The fixture 42 can include locating features including, but not limited to, recesses and/or tabs that mate with corresponding recesses and/or tabs of the second joint assembly 14,16. The partially assembled propeller shaft 10 (i.e., tube 12 and first joint assembly 14,16) is concentrically located on the central axis A by the fixture 42 and is assembled onto the weld yoke 18 of the second joint assembly 14,16. More specifically, the land 20 is received into the tube 12. The inductor assembly 30 encompasses the second joint assembly 14,16, the driver ring 24B and the tube 12 and is energized to induce welding of the tube 12 and the second joint assembly 14,16, as described in detail above. Gases generated by the magnetic pulse welding process escape through the vent passage 22 of the first joint assembly 14,16 and/or the second joint assembly 14, 16.

The method of the present invention provides an improved weld for welding two components such as a tube to an end fitting (e.g., a joint). A significant improvement is achieved when welding a steel tube to a steel end fitting using the method of the present invention over traditional magnetic pulse welding methods. Further, the method of the present invention enables the end fitting to have a more simple design and to be less expensive by reducing the need for features to be formed in the external circumference of the land.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of assembling a driveshaft, comprising:
assembling a first driver ring onto a first end of a tube;

setting a first joint assembly in a first fixture to align a center axis of said first joint assembly with an assembly axis;

retaining said tube in a tube fixture to align a center axis of said tube with said assembly axis;

inserting a land of said first joint assembly into said first end of said tube;

collapsing said first driver ring and said first end of said tube about said land of said first joint assembly using a magnetic pulse welding apparatus to weld said tube to said land; and venting gases generated within said tube during welding out a vent passage formed in said first joint assembly.

2. The method of claim 1 further comprising venting gases generated within said tube during welding out a second end of said tube.

3. The method of claim 1 wherein said first driver ring is press-fit onto said first end.

4. The method of claim 1 wherein said first driver ring has a higher electrical conductivity than said tube.

5. The method of claim 1 further comprising:
assembling a second driver ring onto a second end of said tube;
setting a second joint assembly in a second fixture to align a center axis of said second joint assembly with said assembly axis;
inserting a land of said second joint assembly into said second end of said tube; and
collapsing said second driver ring and said second end of said tube about said land of said second joint assembly using a magnetic pulse welding apparatus to weld said tube to said land.

6. The method of claim 5 wherein said second driver ring is press-fit onto said first end.

7. The method of claim 5 wherein said second driver ring has a higher electrical conductivity than said tube.

8. A method of assembling a driveshaft, comprising;
providing a tube that is formed of an electrically conductive metal material, the tube having a first end and a second end;

installing a first driver ring to the first end of the tube, the first driver ring being formed of a material selected from a group consisting of copper, aluminum, silver and alloys thereof;

installing a second driver ring to the second end of the tube, the second driver ring being formed of a material selected from a group consisting of copper, aluminum, silver and alloys thereof;

providing a first weld yoke having a flange member and a cylindrical land;

assembling the first weld yoke to the tube such that the flange member of the first weld yoke abuts the first end of the tube and the cylindrical land of the first weld yoke is received in the tube, the first weld yoke closing the first end of the tube;

applying a magnetic field to at least the first driver ring to weld the tube to the cylindrical land of the first weld yoke;

providing a second weld yoke having a flange member and a cylindrical land, a vent hole being formed through the flange member and the cylindrical land of the second weld yoke;

assembling the second weld yoke to the tube such that the flange member of the second weld yoke abuts the second end of the tube and the cylindrical land of the second weld yoke is received in the tube, the vent hole being in fluid communication with an interior of the tube; and applying a magnetic field to at least the second driver ring to weld the tube to the cylindrical land of the second weld yoke, wherein air within the tube is vented through the vent hole when the portion of the tube proximate the second end is welded to the second weld yoke.

* * * * *